June 27, 1933.　　W. C. HEDGCOCK　　1,916,150
TRUCK
Filed Oct. 2, 1931　　3 Sheets-Sheet 1

Inventor:
William C. Hedgcock,
By Wilkinson, Huxley, Byron & Knight
attys.

June 27, 1933. W. C. HEDGCOCK 1,916,150
TRUCK
Filed Oct. 2, 1931   3 Sheets-Sheet 2
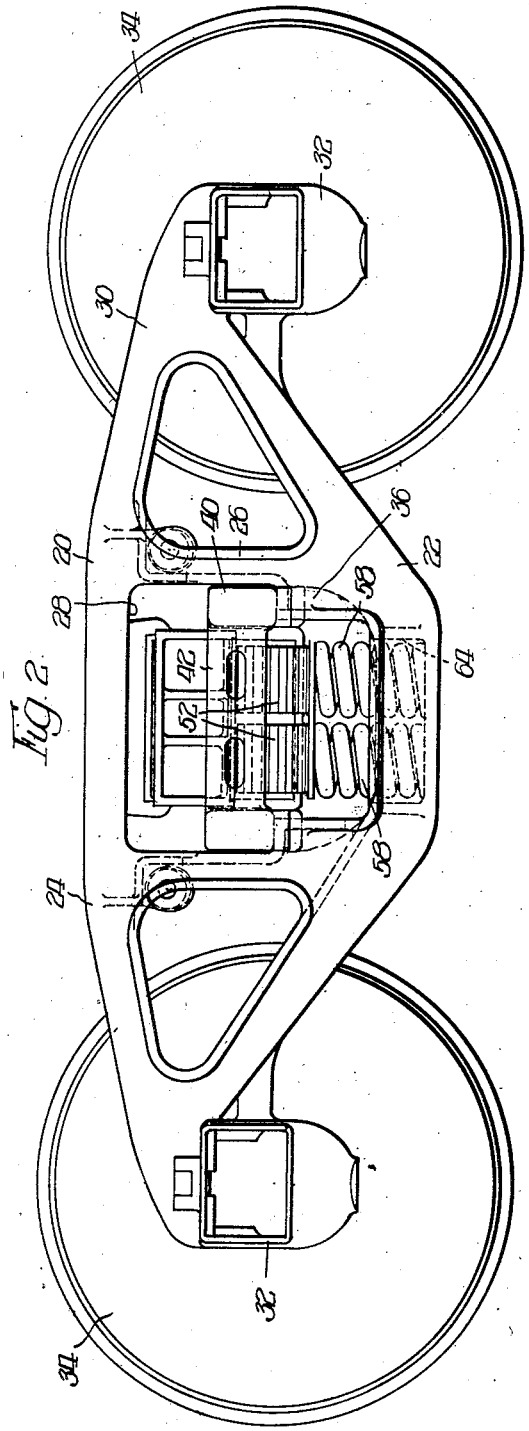
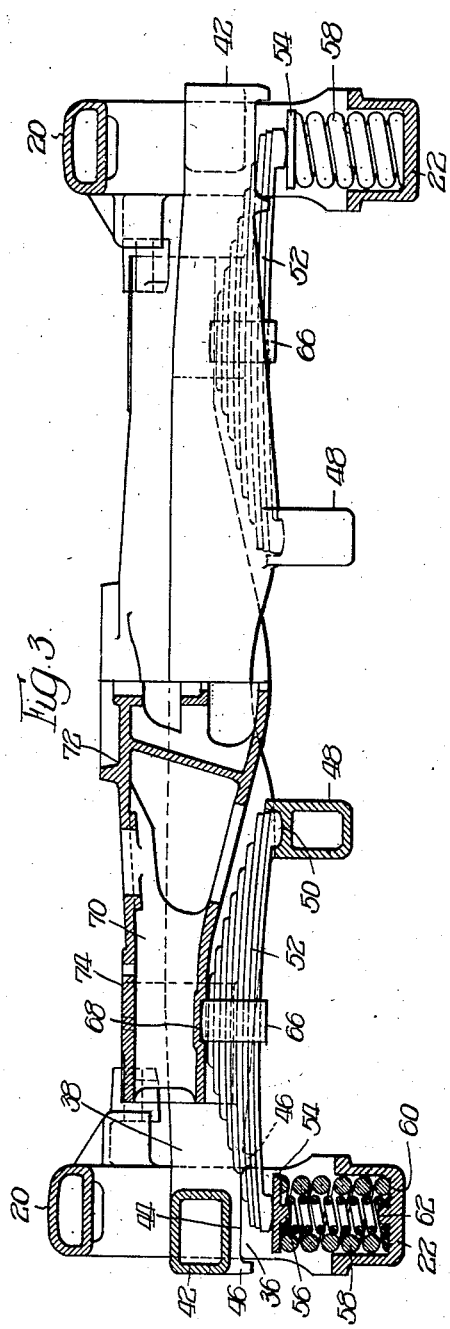
Inventor:
William C. Hedgcock,
By Wilkinson, Huxley, Byron & Knight
Attys.

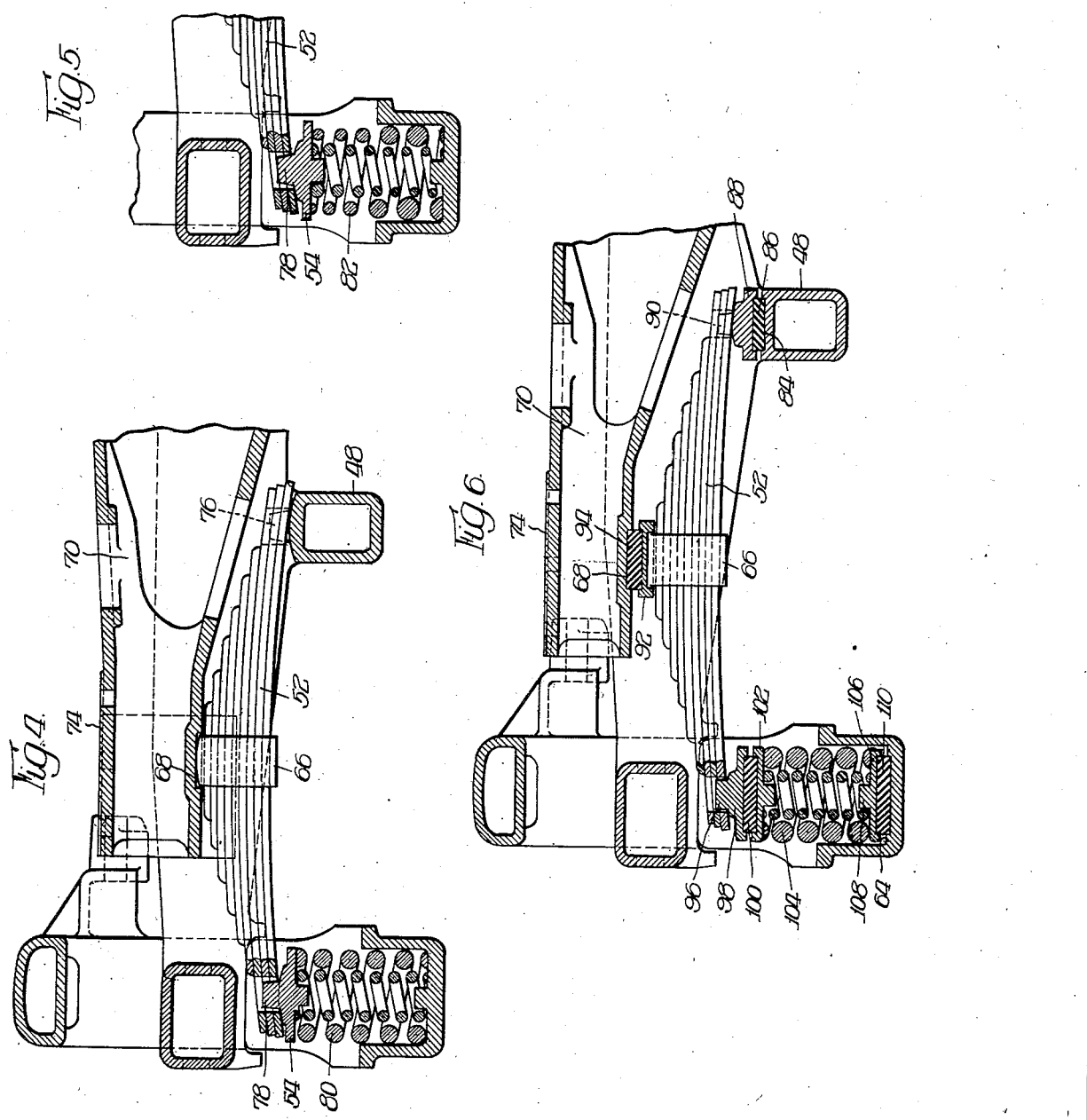

Patented June 27, 1933

1,916,150

UNITED STATES PATENT OFFICE

WILLIAM C. HEDGCOCK, OF WILMETTE, ILLINOIS, ASSIGNOR TO AMERICAN STEEL FOUNDRIES, OF CHICAGO, ILLINOIS, A CORPORATION OF NEW JERSEY

TRUCK

Application filed October 2, 1931. Serial No. 566,493.

This invention pertains to car trucks.

Desirable features for freight car trucks are economy, simplicity, lightness, strength and ease of maintenance, and these features are generally obtained within practical limitations on freight trucks now in use. However, present freight car trucks are very deficient in easy riding qualities since the spring suspension usually consists only of coil springs which strike a natural period of oscillation or vibration at some operating speed of the car; the resulting motion imparted to truck parts, car body and lading is violent and destructive and results in much damage to lading. Track or wheel irregularities, even if very slight, will set up this oscillation and when the frequency with which these irregularities are passed over agrees with the vibration period of the springs, the motion amplifiers and continues, due to the lack of dampening qualities in coil springs. The motion may amplify to the extent of causing derailment of the truck.

Efforts have been made to improve this condition by the use of frictional devices with the coil springs for the purpose of dampening the motion, but unless considerable friction is obtained they are not effective enough, and if sufficient friction is obtained, the spring action becomes too stiff and lacks sensitivity.

Passenger car trucks are generally easy riding, due to the use of both coil and elliptic leaf springs in series; the coil springs responding to the light quick shocks, the leaf springs to the slow, heavy impulses. Coil springs are quick and sensitive, leaf springs relatively less so, in response. For this reason, and also by providing coil and leaf springs of different natural vibration periods, they tend to dampen each other's synchronous vibration without impairing free spring response. This condition is obtained by having the different springs in series. Placing leaf and coil springs in parallel is not sufficient, since they then act as a unit and have a common period of vibration.

Although the usual passenger car truck with series arrangement of coil and leaf springs gives good riding qualities, it is undesirably heavy, costly and complicated for freight service. This is partly due to the complete duplication of carrying capacity in both coil and leaf springs.

It is therefore an object of this invention to provide a car truck which provides good riding qualities, and at the same time is economical to make and maintain, is simple and light in construction, and fulfills all requirements of manufacture and service.

Another object of the invention is to provide a car truck wherein the spring suspension is such that springs of different character are placed in series without complete duplication of carrying capacity in each kind.

A further object of the invention is to provide a car truck having springs of different character which are adapted to work independently of each other whereby shocks incident to operation are adequately absorbed.

A still further object of the invention is to provide a car truck wherein the springs are arranged so that each dampens out the other's vibration.

A yet further object is to provide a truck construction wherein resilient pads are provided for dampening out metallic vibrations transmitted through the metallic truck parts, and also for the purpose of deadening noise.

A different object is to provide spring assemblies wherein there is provided softer cushioning action under light loads, while at the same time providing the necessary stiffness and capacity under heavy loads, these features being combined also to provide a construction which reduces any tendency toward synchronous vibration of the springs.

With these and various other objects in view, the invention may consist of certain novel features of construction and operation, as will be more fully described and particularly pointed out in the specification, drawings and claims appended hereto.

In the drawings, which illustrate embodiments of the device and wherein like reference characters are used to designate like parts—

Figure 2 is a side elevation of the truck construction shown in Figure 1;

Figure 1:
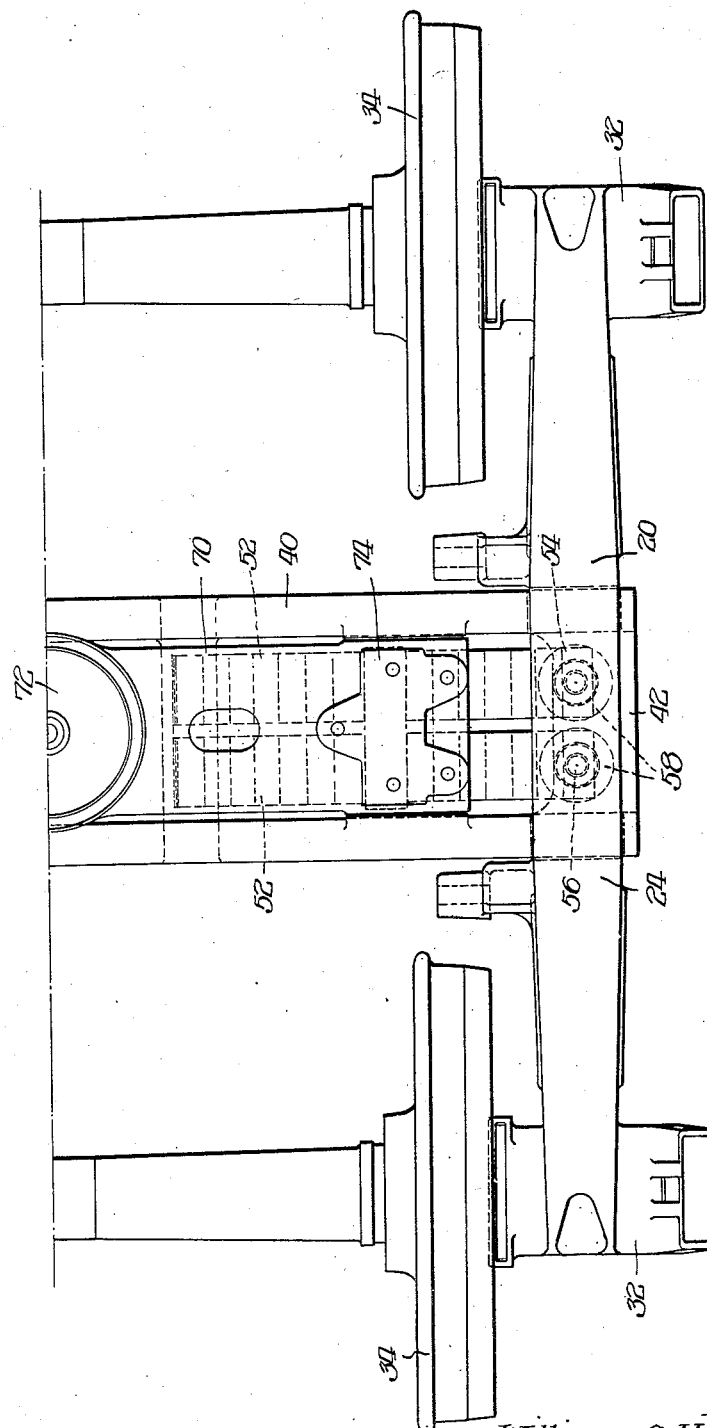
Figure 1 is a fragmentary top plan view of a truck construction embodying the invention.

Figure 3 is a transverse fragmentary sectional elevation of a portion thereof, the same being taken substantially on the transverse center line of the truck construction shown in Figures 1 and 2; and Figures 4, 5 and 6 are fragmentary sectional elevations taken substantially on the transverse center line of the truck construction shown in Figures 1 and 2, the same showing modified forms of constructions.

Referring first of all more particularly to the construction shown in Figures 1, 2 and 3, the side frame 20 is preferably of truss construction including the tension member 22 and the compression member 24 integrally connected by spaced column guides 26 forming the window 28 in the side frame. The tension and compression members converge adjacent their ends as at 30, and are provided with the journal boxes 32 shown as of the standard A. R. A. construction, though they may be of any preferable construction. The journal boxes have cooperative relation with the journal ends of the wheel and axle assemblies 34 which also may be of any preferable construction.

The column guides 26 are provided with spaced transom seats 36 extending into the window 28 and on which is mounted the transom 38. The transom 38 includes the spaced members 40 integrally connected at each end by means of the members 42. The transoms are seated upon the transom seats 36 and the seat members 44, the seat members being provided with the depending lugs 46 embracing each side of the side frame at the transom seats 36, thus preventing lateral displacement of the side frames and transom, and preventing the side frames from twisting laterally. In the event that it is necessary to adjust the height of the transom, and consequently the bolster (to be later described), or to compensate for wheel wear and other causes which might result in undesired variations in the car coupler heights above the rail, shims of any desired thickness may be inserted between the seats 44 and 36. For this reason the lugs 46 extend downwardly a sufficient distance whereby they still embrace the seats 36 even after the application of the shims.

The spaced transom members 40 are connected intermediate the side frames by means of the integral members 48, said members being provided with spring seats 50 receiving the inner end of the leaf spring assemblies 52. The outer ends of the leaf spring assemblies 52 are supported on the spring cap 54, said spring cap being provided with the depending positioning dowel 56 and engaging or seated upon the coil spring assemblies 58. The coil spring assemblies 58 are seated on the spring seat 60 and positioned by the positioning dowel 62, said spring seat being provided in the bottom or the lower chord of the side frame tension member between the columns and transom seats, the pocket 64 being thus formed therein. The semi-elliptic leaf springs 52 are provided with the spring band 66 which engages the seat 68 provided in the lower chord of the transom 70. The transom 70 is disposed between the spaced members 40 and is provided with the usual center and side bearings 72 and 74. The bolster is shorter than the distance between the side frames and is guided in its vertical movement between the transom members 40.

In the construction illustrated in Figure 4 the parts are substantially the same as have already been described. The seat member 48 of the transom is shown of slightly varied construction, being provided with the upwardly extending positioning dowel 76 adapted to be received in a suitable aperture formed in the inner ends of the leaf spring assemblies 52. The spring cap 54 is likewise provided with the upwardly extending dowel 78 receivable in a suitable aperture formed in the outer ends of the semi-elliptic leaf spring assemblies.

In the construction described with respect to Figures 1, 2 and 3, the spring assembly 58 is shown of constant pitch, whereas in the construction shown in Figure 4 the coil spring assembly 80 is made up of springs of variable pitch, whereas in Figure 5 the coil spring assemblies 82 are formed from tapering bars whereby the sections of the springs are varied. It will of course be understood that other springs of variable stiffness may be provided, such as disclosed in application Serial No. 552,153, filed July 21, 1931.

In the construction shown in Figure 6 the member 48 is recessed as at 84 for the reception of the rubber or other resilient pad 86, and an inner spring seat member 88 is similarly recessed and supported on said pad, said member being provided with the upwardly extending dowel 90 engaged in a suitable aperture formed in the inner end of the semi-elliptic leaf spring assembly 52. The spring band 66 is received in the seat member 92 and the resilient pad 94 is disposed between said member and the seat 68 provided in the bolster 70. The outer end of the leaf spring assembly is apertured for receiving the upstanding dowel 96 formed on the cap member 98, the resilient pad 100 being disposed between said member and the upper spring seat member 102 disposed on the coil spring assembly 104. The coil spring assembly is supported on the lower spring seat member 106 positioned by means of the dowel 108 and the resilient pad 110 is disposed between the member 106 and the pocket 64 provided in the side frame.

In operation, as will be seen, the coil springs and leaf springs are in series. Each can work independently of the other and the coil springs are free to respond quickly to sudden shocks, the leaf springs conforming to slower impulses. However, each reacts against the other and effectively serves to "ripple out" or break up synchronous vibration. This is particularly effective when the two kinds of springs have different natural vibration periods. During the action of either spring the leaf spring also acts as an equalizer to compensate for differences in level between its non-resilient end connection and resilient end connection. The leaf springs do a certain amount of work absorption which also tends to defeat synchronous vibration and yet does not impair the sensitiveness of the coil springs.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

What is claimed is:

1. In a truck side frame, the combination of an upper compression member and a lower tension member, spaced columns joining said compression and tension members, spaced transom seats, and a spring seat on said lower tension member between said spaced columns.

2. In a car truck, the combination of a side frame, a transom supported on said side frame, a bolster, a leaf spring supporting said bolster at a point and supported on said transom at one end of said spring, said leaf spring being supported on said side frame at the other end thereof through a metallic spring disposed below said leaf spring.

3. In a car truck, the combination of a side frame, a transom supported on said side frame said transom including spaced members, a spring seat connecting said members, a bolster disposed between said spaced members, a semi-elliptic leaf spring supporting said bolster intermediate the ends of said spring, said spring being supported at one end thereof on said spring seat, and supported at another end thereof on said side frame through a metallic spring disposed below said leaf spring.

4. In a car truck, the combination of a side frame, a transom supported on said side frame, said transom including spaced members, a spring seat connecting said members below said members, a bolster disposed between said spaced members, a semi-elliptic leaf spring supporting said bolster intermediate the ends of said spring, said spring being supported at one end thereof on said spring seat, and supported at another end thereof on said side frame through the coil spring disposed below said leaf spring.

5. In a car truck, the combination of a side frame, a transom supported on said side frame, said transom including spaced members, a spring seat connecting said members below said members and inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a metallic spring disposed below said leaf spring.

6. In a car truck, the combination of a side frame, a transom supported on said side frame, said transom including spaced members, a spring seat connecting said members below said members and inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring.

7. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a metallic spring disposed below said leaf spring.

8. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring.

9. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring, said coil spring being of variable stiffness.

10. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring, said coil spring being of variable diameter.

11. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring, said coil spring being of variable pitch.

12. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring, said coil spring being of variable pitch and variable diameter.

13. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat and supported at another end thereof on said side frame through a coil spring disposed below said leaf spring, said coil spring being of variable section.

14. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring, and a resilient pad interposed between said leaf spring and bolster.

15. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring, and a resilient pad interposed between said leaf and coil springs.

16. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring and a resilient pad interposed between said leaf spring and said seat.

17. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring and a resilient pad interposed between said resilient spring and said side frame.

18. In a car truck, the combination of a side frame, a transom supported on said side frame, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring and resilient pads interposed between associated truck parts.

19. In a car truck, the combination of a side frame including tension and compression members and integral spaced column guides forming a window therewith, a transom supported on said side frame in said window, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring.

20. In a car truck, the combination of a side frame including tension and compression members and spaced columns integrally connecting said tension and compression members and forming a window therewith, said columns being provided with seats intermediate said tension and compression members, a transom supported on said spaced seats in said window, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring.

21. In a car truck, the combination of a side frame including tension and compression members and spaced columns integrally connecting said tension and compression members and forming a window therewith, said columns being provided with seats intermediate said tension and compression members, a transom supported on said spaced seats in said window, said transom including spaced members, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a metallic spring disposed below said leaf spring.

22. In a car truck, the combination of a side frame including tension and compression members and spaced columns integrally termediate the tension and compression members and forming a window therewith, said columns being provided with seats intermediate the tension and compression members, said tension member between said columns being provided with a spring pocket, a transom including spaced members, said transom being supported on said seats substantially in the plane of said side frame, a spring seat connecting said members inwardly of said side frame, a bolster disposed between said spaced members, a semi-elliptic leaf spring supporting said bolster intermediate the ends of said spring said spring being supported at one end thereof on said spring seat, and supported at another end thereof on said side frame through a metallic spring disposed below said leaf spring and seated in said spring pocket.

23. In a car truck, the combination of a side frame including tension and compression members and spaced columns integrally connecting said tension and compression members and forming a window therewith, said columns being provided with seats intermediate the tension and compression members, said tension member between said columns being provided with a spring pocket, a transom including spaced members, said transom being supported on said seats substantially in the plane of said side frame, a spring seat connecting said members inwardly of said side frame, a bolster disposed between said spaced members, a semi-elliptic leaf spring supporting said bolster intermediate the ends of said spring, said spring being supported at one end thereof on said spring seat, and supported at another end thereof on said side frame through a coil spring disposed below said leaf spring and seated in said spring pocket.

24. In a car truck, the combination of a side frame including tension and compression members and spaced integrally connecting columns forming a window therewith, a transom supported on said tension member in said window, said transom including spaced members and a spring seat disposed inwardly of said side frame, a spring seat disposed on said tension member in said window, a bolster disposed between said spaced members, a semi-elliptic leaf spring supported on said seats and supporting said bolster between said seats, and a coil spring interposed between one end of said leaf spring and one of said seats and below said leaf spring.

25. In a car truck, the combination of a side frame including tension and compression members and spaced integrally connecting columns forming a window therewith, a transom supported on said tension member in said window, said transom including spaced members and a spring seat disposed inwardly of said side frame, a spring seat disposed on said tension member in said window, a bolster disposed between said spaced members, a semi-elliptic leaf spring supported on said seats and supporting said bolster between said seats, and a metallic spring of different character than said leaf spring interposed between one end of said leaf spring and one of said seats and below said leaf spring.

26. A transom including spaced members having connecting end members and a seat provided adjacent the ends for seating said transom on side frames, and connecting members integrally connecting said spaced members inwardly of said end members and provided with leaf spring seats.

Signed at Chicago, Illinois, this 22nd day of September, 1931.

WILLIAM C. HEDGCOCK.

CERTIFICATE OF CORRECTION.

Patent No. 1,916,150.  June 27, 1933.

WILLIAM C. HEDGCOCK.

It is hereby certified that error appears in the printed specification of the above numbered patent requiring correction as follows: Page 1, line 20, for "amplifiers" read "amplifies"; page 5, line 39, claim 22, for "termediate the" read "connecting said"; and that the said Letters Patent should be read with these corrections therein that the same may conform to the record of the case in the Patent Office.

Signed and sealed this 29th day of August, A. D. 1933.

M. J. Moore.

(Seal)  Acting Commissioner of Patents.